US012567003B2

(12) United States Patent
Acharya et al.

(10) Patent No.: US 12,567,003 B2
(45) Date of Patent: Mar. 3, 2026

(54) TECHNOLOGIES FOR DECENTRALIZED FLEET ANALYTICS

(71) Applicant: ABB Schweiz AG, Baden (CH)

(72) Inventors: Mithun P. Acharya, Cary, NC (US); Jeffrey Harding, Holly Springs, NC (US); Karl Eric Harper, Cary, NC (US); Aldo Dagnino, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 569 days.

(21) Appl. No.: 16/822,293

(22) Filed: Mar. 18, 2020

(65) Prior Publication Data

US 2021/0295215 A1      Sep. 23, 2021

(51) Int. Cl.
| | |
|---|---|
| *G06F 17/00* | (2019.01) |
| *G06N 20/20* | (2019.01) |
| *G06Q 10/0631* | (2023.01) |
| *G06Q 50/04* | (2012.01) |

(52) U.S. Cl.
CPC ......... G06N 20/20 (2019.01); G06Q 10/0631 (2013.01); G06Q 50/04 (2013.01)

(58) Field of Classification Search
CPC ..... G06N 20/20; G06Q 10/0631; G06Q 50/04
USPC .......................................................... 706/12
See application file for complete search history.

(56) References Cited

U.S. PATENT DOCUMENTS

| | | | |
|---|---|---|---|
| 8,103,389 B2 | 1/2012 | Golden et al. | |
| 9,008,827 B1 | 4/2015 | Dwarakanath et al. | |

| | | | |
|---|---|---|---|
| 9,557,723 B2 | 1/2017 | Nasle | |
| 9,984,337 B2 * | 5/2018 | Kadav | ..................... G06N 20/00 |
| 11,205,137 B2 * | 12/2021 | Benke | ....................... H04L 9/50 |
| 11,328,222 B1 * | 5/2022 | Matthews | .......... H04L 49/3027 |
| 2014/0379156 A1 | 12/2014 | Kamel et al. | |
| 2017/0308802 A1 * | 10/2017 | Ramsøy | .............. H04L 63/0421 |
| 2018/0255082 A1 * | 9/2018 | Ostergaard | ............. G06N 20/00 |
| 2018/0285772 A1 * | 10/2018 | Gopalan | ................ G06N 20/00 |
| 2018/0338001 A1 * | 11/2018 | Pereira Cabral | ...... H04L 67/141 |

(Continued)

FOREIGN PATENT DOCUMENTS

| | | |
|---|---|---|
| CN | 108475252 A | 8/2018 |
| CN | 109983483 A | 7/2019 |
| CN | 110689139 A | 1/2020 |

OTHER PUBLICATIONS

International Search Report and Written Opinion for related PCT/US2020/060951, mailed Jan. 29, 2021, 11 pages.

(Continued)

*Primary Examiner* — Paul C Mccord
(74) *Attorney, Agent, or Firm* — Michael M. Gnibus; McCarter & English, LLP

(57) ABSTRACT

Technologies for decentralized fleet analytics are disclosed. In at least one embodiment, a local cloud service at a plant site builds a first machine learning model of one or more first streams of data associated with the plant site. The local cloud service sends the first machine learning model to a cloud service connected to the plant site and other plant sites. The local cloud service receives a second machine learning model from the cloud service. The second machine learning model is trained as a function of the first machine learning model and one or more machine learning models built by the other plant sites. The local cloud service updates the first machine learning model based on the second machine learning model.

18 Claims, 6 Drawing Sheets

(56)　　　　　References Cited

U.S. PATENT DOCUMENTS

| | | | | |
|---|---|---|---|---|
| 2019/0174514 | A1* | 6/2019 | Ramesh | G06F 9/5066 |
| 2019/0361839 | A1* | 11/2019 | Kundu | G06F 15/7807 |
| 2019/0385092 | A1* | 12/2019 | Benke | G06N 20/00 |
| 2021/0166157 | A1* | 6/2021 | Bhowmick | G06N 20/20 |
| 2021/0287114 | A1* | 9/2021 | Zhou | G06N 5/04 |
| 2023/0006980 | A1* | 1/2023 | Poorebrahim Gilkalaye | G06F 18/24 |
| 2023/0016827 | A1* | 1/2023 | Wu | G06N 3/098 |
| 2023/0068386 | A1* | 3/2023 | Akdeniz | G06N 3/063 |

OTHER PUBLICATIONS

Chinese Office Action for Application No. 202080101281.3, dated Dec. 30, 2024, 15 pages.
Wang et al., "BIDE: Efficient Mining of Frequent Closed Sequences", National Science Foundation, 12 pages, available 2004.
"Apache Spark™—Unified Analytics Engine for Big Data", downloaded from spark.apache.org on Mar. 18, 2020, 5 pages.
"Ensemble learning", downloaded from Wikipedia on Mar. 18, 2020, 13 pages.
Guest blog: PMML Support in Apache Spark's MLlib:, downloaded from https://databricks.com/blog/2015/07/02/pmml-support-in-apache-spark-mllib.html on Mar. 18, 2020, 5 pages.
"Lambda architecture", downloaded from Wikipedia on Mar. 18, 2020, 4 pages.
"Apache Spark 2.0 Preview: Machine Learning Model Persistence", downloaded from http://cdn2.hubspot.net/hubfs/438089/notebooks/spark2.0/ML%20persistence%20in%202.0.html on Mar. 18, 2020, 8 pages.
"Key Performance Indicator Markup Language (KPI-ML)", downloaded from www.mesa.org/en/KPIML.asp on Mar. 18, 2020, 2 pages.
"Subject: What are combination, activation, error, and objective functions?", downloaded Mar. 18, 2020, 49 pages.
"Incremental and Decremental Support Vector Machine Learning", downloaded on Mar. 18, 2020, 7 pages.
"Online machine learning", downloaded from Wikipedia on Mar. 18, 2020, 9 pages.
"Predictive Model Markup Language", downloaded from Wikipedia on Mar. 18, 2020, 5 pages.
"Spark Streaming Programming Guide", downloaded from park.apache.org/docs/latest/streaming-programming-guide.html#mllib-operations on Mar. 18, 2020, 33 pages.
David Heckerman, A Tutorial on Learning With Bayesian Networks, heckerma@microsoft.com, Mar. 1995 (Revised Nov. 1996), 58 pages.

* cited by examiner

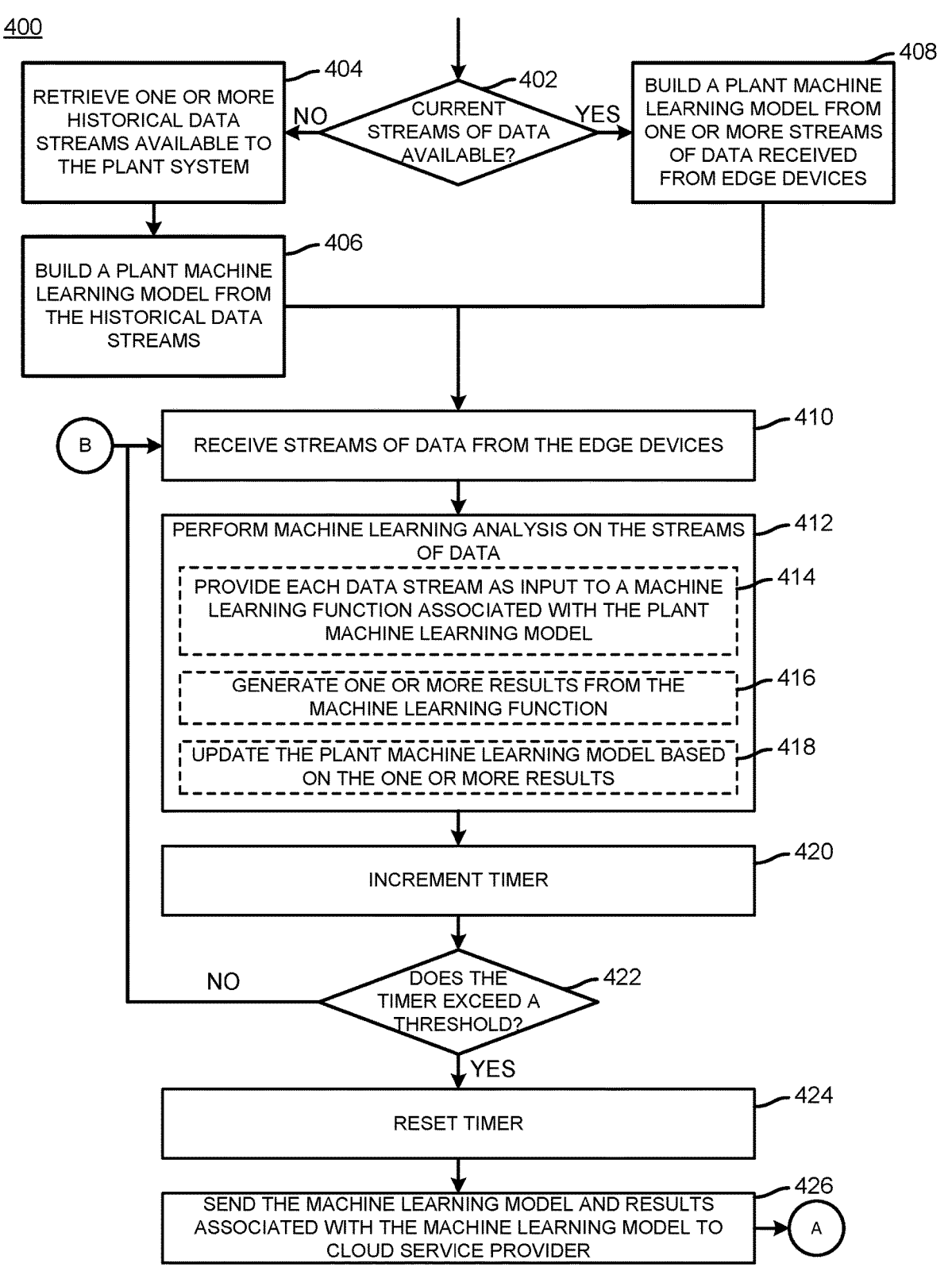

400

404 — RETRIEVE ONE OR MORE HISTORICAL DATA STREAMS AVAILABLE TO THE PLANT SYSTEM

402 — CURRENT STREAMS OF DATA AVAILABLE?

NO

YES

408 — BUILD A PLANT MACHINE LEARNING MODEL FROM ONE OR MORE STREAMS OF DATA RECEIVED FROM EDGE DEVICES

406 — BUILD A PLANT MACHINE LEARNING MODEL FROM THE HISTORICAL DATA STREAMS

B

410 — RECEIVE STREAMS OF DATA FROM THE EDGE DEVICES

412 — PERFORM MACHINE LEARNING ANALYSIS ON THE STREAMS OF DATA

414 — PROVIDE EACH DATA STREAM AS INPUT TO A MACHINE LEARNING FUNCTION ASSOCIATED WITH THE PLANT MACHINE LEARNING MODEL

416 — GENERATE ONE OR MORE RESULTS FROM THE MACHINE LEARNING FUNCTION

418 — UPDATE THE PLANT MACHINE LEARNING MODEL BASED ON THE ONE OR MORE RESULTS

420 — INCREMENT TIMER

422 — DOES THE TIMER EXCEED A THRESHOLD?

NO

YES

424 — RESET TIMER

426 — SEND THE MACHINE LEARNING MODEL AND RESULTS ASSOCIATED WITH THE MACHINE LEARNING MODEL TO CLOUD SERVICE PROVIDER

RECEIVE A MACHINE LEARNING MODEL FROM THE CLOUD SERVICE PROVIDER THAT IS TRAINED AS A FUNCTION OF THE MACHINE LEARNING MODEL AND ONE OR MORE MACHINE LEARNING MODELS FROM OTHER PLANT SITES — 428

UPDATE THE PLANT MACHINE LEARNING MODEL BASED ON THE MACHINE LEARNING MODEL RECEIVED FROM THE CLOUD SERVICE PROVIDER — 430

600

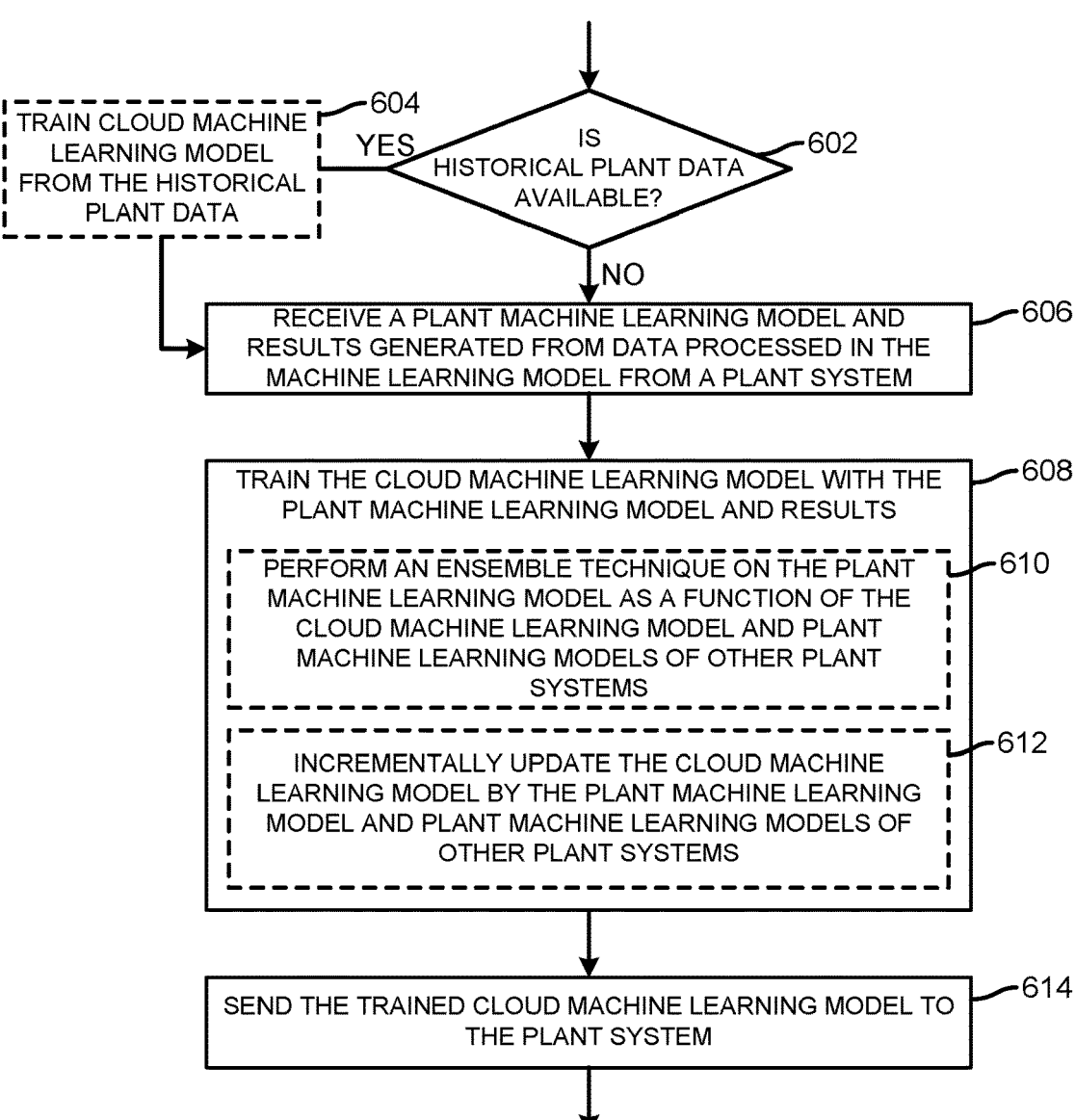

TRAIN CLOUD MACHINE LEARNING MODEL FROM THE HISTORICAL PLANT DATA ⌐604

YES

IS HISTORICAL PLANT DATA AVAILABLE? ⌐602

NO

RECEIVE A PLANT MACHINE LEARNING MODEL AND RESULTS GENERATED FROM DATA PROCESSED IN THE MACHINE LEARNING MODEL FROM A PLANT SYSTEM ⌐606

TRAIN THE CLOUD MACHINE LEARNING MODEL WITH THE PLANT MACHINE LEARNING MODEL AND RESULTS ⌐608

PERFORM AN ENSEMBLE TECHNIQUE ON THE PLANT MACHINE LEARNING MODEL AS A FUNCTION OF THE CLOUD MACHINE LEARNING MODEL AND PLANT MACHINE LEARNING MODELS OF OTHER PLANT SYSTEMS ⌐610

INCREMENTALLY UPDATE THE CLOUD MACHINE LEARNING MODEL BY THE PLANT MACHINE LEARNING MODEL AND PLANT MACHINE LEARNING MODELS OF OTHER PLANT SYSTEMS ⌐612

SEND THE TRAINED CLOUD MACHINE LEARNING MODEL TO THE PLANT SYSTEM ⌐614

FIG. 6

TECHNOLOGIES FOR DECENTRALIZED FLEET ANALYTICS

TECHNICAL FIELD

The present disclosure relates to technologies for decentralized fleet analytics, including the analysis of data from a fleet of plants or installations of one or more entities.

BACKGROUND

Fleet analytics typically involves gathering data from each plant in a fleet to a centralized location, such as a cloud service provider to which each plant is connected, and analyzing the data to derive machine learning models applicable to the fleet. Therefore, individual plants may then analyze subsequently obtained data using these machine learning models. For example, the derived machine learning models may reliably predict certain outcomes given subsequently obtained data. In addition, the cloud service provider may periodically retrain the machine learning models using this subsequently obtained data.

However, the approach of using a centralized location has several issues. For instance, because this approach is centralized, all data generated at individual plants incur network traffic and overhead costs. Particularly, the data sent by a given plant may be voluminous, which, if sent to the cloud server, would incur high storage costs. Further, in some cases, the plant might not have a reliable connection to the cloud server, which would result in significant network overhead to send the entirety of the data to the cloud server. Another issue is that, particularly in fleets in which plants are owned by distinct entities, such as instances in which the entities are individual customers, entities may be unwilling to share data with the cloud server, as the data may be sensitive in nature.

SUMMARY

An embodiment presented herein discloses a computer-implemented method for analyzing data in one of a plurality of plant sites. The method generally includes building, by a computing device, a first machine learning model of one or more first streams of data associated with the one of the plurality of plant sites. The method also generally includes sending, by the computing device, the first machine learning model to a cloud service. The method also generally includes receiving, by the computing device, a second machine learning model from the cloud service. The second machine learning model is trained as a function of the first machine learning model and one or more machine learning models built by others of the plurality of plant sites. The method also generally includes updating, by the computing device, the first machine learning model based on the second machine learning model.

Another embodiment presented herein discloses a computer-readable storage medium storing a plurality of instructions, which, when executed on a processor, causes a computing device to analyze data in one of a plurality of plant sites. The instructions also cause the computing device to build a first machine learning model of one or more first streams of data associated with the one of the plurality of plant sites. The instructions also cause the computing device to send the first machine learning model to a cloud service and receive a second machine learning model from the cloud service. The second machine learning model is trained as a function of the first machine learning model and one or more machine learning models built by others of the plurality of plant sites. The instructions also cause the computing device to update the first machine learning model based on the second machine learning model.

Yet another embodiment presented herein discloses a computing device having a processor and a memory. The memory stores a plurality of instructions, which, when executed on the processor, cause the computing device to analyze data in one of a plurality of plant sites. The instructions also cause the computing device to build a first machine learning model of one or more first streams of data associated with the one of the plurality of plant sites. The instructions also cause the computing device to send the first machine learning model to a cloud service and receive a second machine learning model from the cloud service. The second machine learning model is trained as a function of the first machine learning model and one or more machine learning models built by others of the plurality of plant sites. The instructions also cause the computing device to update the first machine learning model based on the second machine learning model.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 4 and 5 are simplified flow diagrams of at least one embodiment of a method performable by a compute device at a plant site for generating local machine learning data used in decentralized fleet analytics; and FIG. 6 is a simplified flow diagram of at least one embodiment of a method performable by a compute device of a cloud service provider for generating fleet analytics from one or more machine learning models obtained from a number of plant systems.

DETAILED DESCRIPTION OF THE DRAWINGS

Figure 1:
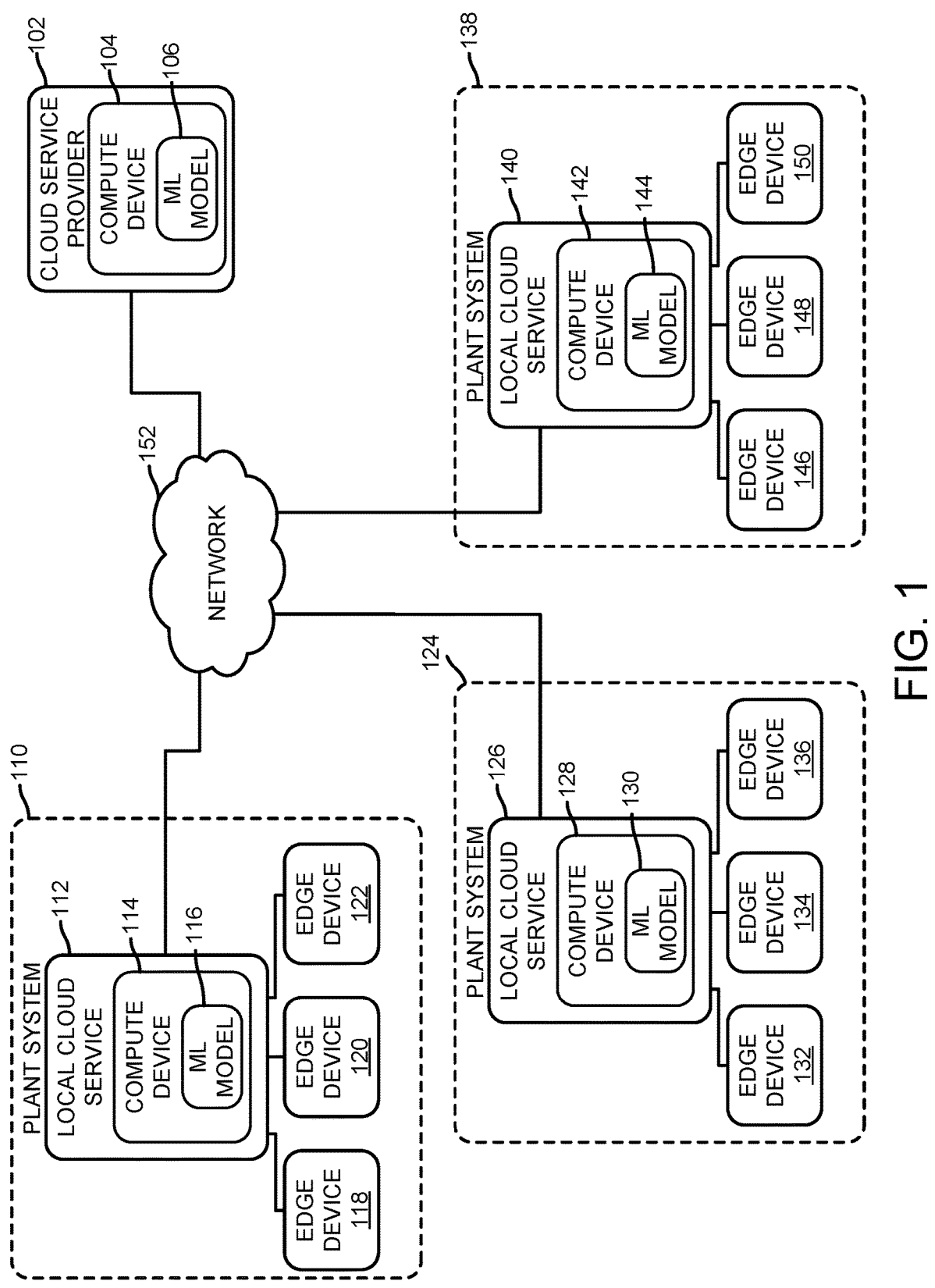
FIG. 1 is a simplified block diagram of at least one embodiment of a computing environment providing decentralized fleet analytics.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments presented herein disclose techniques for providing fleet analytics to individual plants and plant components in a fleet. More particularly, embodiments provide a decentralized approach to provide fleet analytics based on machine learning model output from each individual plant (or a unit of monitored equipment) in the fleet. As further described herein, a system in each individual plant builds a machine learning model from data streams originating from the plant. Each individual plant then provides, as input, data streams (e.g., obtained by sensors, supervisory and control systems, and other observation data from the components within the plant) to the respective machine learning model. Doing so causes the machine learning model to output results as a function of the data streams. The plant then transmits the machine learning model and result output to a cloud server associated with the fleet. Thereafter, the cloud server may generate a machine learning model as a function, at least in part, of the transmitted data of the plants in the fleet. Once generated, the cloud server may transmit the generated machine learning model to each plant. The plants may use the generated machine learning model for local analytics.

Advantageously, the embodiments disclosed herein allow an individual entity to use its existing edge or on-premise analytics and infrastructure. Further, this approach does not require the entity to transmit data streams obtained at plant sensors, which may be sensitive in nature and also voluminous. Instead, the entity may transmit a machine learning model used to obtain analytics and the resulting data, which nevertheless under this approach allows the entity to benefit from a collective knowledge of the fleet and computing power afforded by cloud resources.

Referring now to FIG. 1, a computing environment 100 for providing decentralized fleet analytics includes a cloud service provider 102 and plant systems 110, 124, and 138. Each of the cloud service provider 102 and plant systems 110, 124, and 138 are interconnected via a network 152 (e.g., the Internet). The cloud service provider 102 is an entity that generally provides online services to users. The cloud service provider 102 may be composed of physical resources (e.g., compute, storage, memory) that are available on-demand to users. For instance, in an embodiment, the physical resources of the cloud service provider 102 may include a compute device 104 that generates analytics (e.g., though one or more machine learning (ML) models 106) from data sent by the plant systems 110, 124, and 138.

In an embodiment, the plant systems 110, 124, 138 (also collectively referred herein as a "fleet") each represent an industrial plant in a given location. In some cases, the plant systems 110, 124, 138 may be affiliated one another (e.g., as distinct plants of an organization) or may be completely separate entities that are users of the analytics services of the cloud service provider 102. As shown, each plant system 110, 124, 138 includes a local cloud service 112, 126, 140 respectively. The local cloud service 112, 126, 140 may be embodied as a collection of physical resources associated with the respective plant system 110, 124, 138 (e.g., located within the plant system 110, 124, 138 itself or another geographic location). For instance, in an embodiment, the local cloud service 112, 126, 140 may include a respective compute device 114, 128, 142 used to generate analytics (e.g., using ML models 116, 130, 144, respectively) from data collected from sensor equipment of the plant systems. Edge devices within the plant systems may be configured with such sensor equipment or may also receive sensor data from other equipment (e.g., power generators, welding robots, temperature sensors, etc.), supervisory and control systems, or observation data collected by some other means. Illustratively, plant system 110 includes edge devices 118, 120, 122; plant system 124 includes edge devices 132, 134, 136; and plant system 138 includes edge devices 146, 148, and 150.

Turning to plant system 110 as an example, edge device 118 may correspond to a camera system in the plant having various visual and audio sensors, edge device 120 may correspond to a thermal control unit that obtains data from thermal sensors, and edge device 122 may correspond to a compute device that collects data from various sensors from other equipment within the plant system 110. Each of the edge devices 118, 120, 122 transmit the collected data as streams of data (or in batches of data sent periodically; a lambda architecture allows for application of both methods) to the local cloud service 112. In turn, the local cloud service 112 may generate, by inputting the collected data to the ML models 116, various analytics. For example, the analytics may include predictive outcomes for the data based on given inputs.

Further, the ML models 116, 130, 144 may rely on knowledge derived from the collective data streams obtained from plant systems 110, 124, 138 to produce more reliable analytics for new data streams collected at each plant system. At the same time, some users may desire to preserve the privacy of the data at a respective plant system as well as preserve network capacity at the plant system. To account for these concerns, in an embodiment, the compute device 104 receives ML models 116, 130, 144 and results produced therefrom to update each of the ML models 116, 130, 144.

Particularly, the compute device 104 may use ensemble machine learning techniques to generate a ML model based on a given received ML model 116, 130, 144 and the ML model 106. Because the generated ML model is a combination of ML model 106 and the given ML model 116, 130, 144, the predictive ability of the generated ML model is at least equal to that of the given ML model 116, 130, 144. Thereafter, the compute device 104 may transmit the generated ML model to the plant system 110, 124, 138. Advantageously, using the generated ML model for subsequently obtained data allows the plant system 116, 124, 138 to benefit from analytics and insight for the entire fleet.

Further, in an embodiment, the plant systems 110, 124, 138 may transmit results and key performance indicators (KPIs) from using the generated ML model to the cloud service provider 102. For example, a given compute device 114, 128, 142 may input KPI data to a markup language format (e.g., in an Extensible Markup Language (XML) format) and export the data to the cloud service provider 102. Doing so allows the compute device 104 to update the generated ML model and also generate a fleet analytics dashboard accessible to the user (e.g., through a management console executing on the compute devices 114, 128, 142).

Note, the above references the plant systems 110, 124, 138 as a fleet. However, one of skill in the art will recognize that a fleet may also comprise a collection of equipment associated with an individual plant or user. For example, a fleet may correspond to welding robots of the plant system 110 that transmit actuator data to the local cloud service 112. The fleet may also include cutting tools and monitoring equipment relating to those cutting tools within the plant system 100. Embodiments presented herein may also be adapted to equipment fleets.

Figure 2:
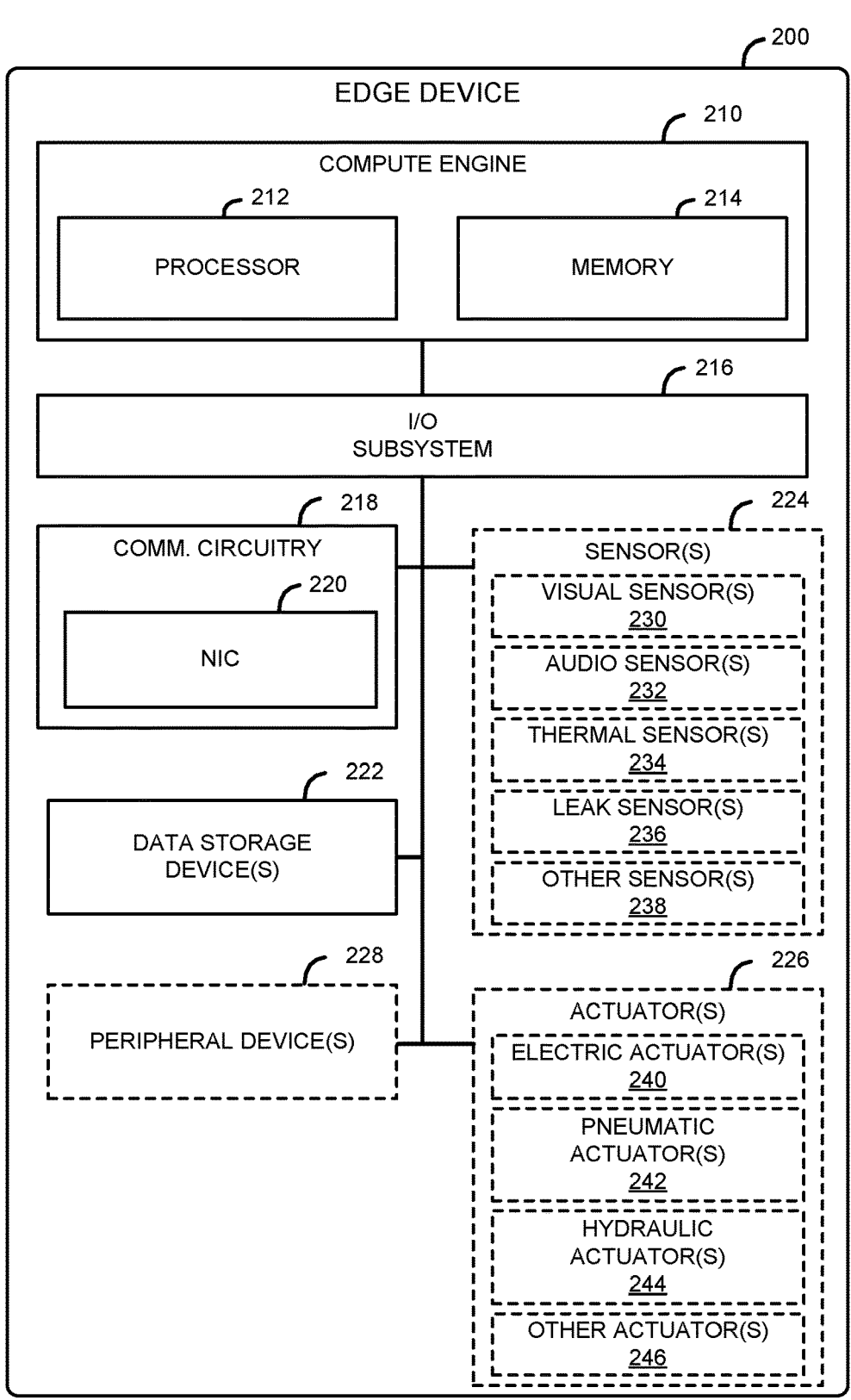
FIG. 2 is a simplified block diagram of at least one embodiment of one of the edge devices of FIG. 1 configured to send streams of data as input to a local machine learning model.

Referring now to FIG. 2, an edge device 200 is shown. The edge device 200 is representative of any of the edge devices 118, 120, 122, 132, 134, 136, 146, 148, and 150 described relative to FIG. 1. The illustrative edge device 200 includes a compute engine 210, an input/output (I/O) subsystem 216, communication circuitry 218, and one or more data storage devices 222. Of course, in other embodiments, the edge device 200 may include other or additional components, such as those commonly found in a computer (e.g., display, peripheral devices, etc.). Additionally, in some embodiments, one or more of the illustrative components may be incorporated in, or otherwise form a portion of, another component. Of course, the components depicted in FIG. 2 are merely provided as examples to illustrate the embodiments disclosed herein. In practice, the actual edge device 200 may include additional or fewer components.

The compute engine 210 may be embodied as any type of device or collection of devices capable of performing various compute functions described below. In some embodiments, the compute engine 210 may be embodied as a single device such as an integrated circuit, an embedded system, a field programmable gate array (FPGA), a system-on-a-chip (SOC), or other integrated system or device. Additionally, in some embodiments, the compute engine 210 includes or is embodied as a processor 212 and a memory 214. The processor 212 may be embodied as one or more processors, each processor being a type capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an ASIC, reconfigurable hardware or hardware circuitry, or other specialized hardware to facilitate performance of the functions described herein.

The memory 214 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In some embodiments, all or a portion of the memory 214 may be integrated into the processor 212.

The compute engine 210 is communicatively coupled with other components of the computing environment 100 via the I/O subsystem 216, which may be embodied as circuitry and/or components to facilitate input/output operations with the compute engine 210 (e.g., with the processor 212 and/or the memory 214) and other components of the edge device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the edge device 200, into the compute engine 210.

The communication circuitry 218 may be embodied as any communication circuit, device, or collection thereof, capable of enabling communications over a network between the edge device 200 and other devices, such as the compute devices 114, 128, 142. The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 is a hardware component that connects the edge device 200 to a computer network. The NIC 220 implements circuitry used to communicate using a given physical layer and data link layer standard (e.g., Ethernet, WiFi, etc.). Doing so provides a base for a full network protocol stack to allow communication among other devices. The NIC 220 may be embodied as one or more add-in-boards, daughtercards, controller chips, chipsets, or other devices that may be used by the edge device 200 for network communications with remote devices. For example, the NIC 220 may be embodied as an expansion card coupled to the I/O subsystem 216 over an expansion bus such as PCI Express.

The one or more illustrative data storage devices 222 may be embodied as any type of devices configured for short-term or long-term storage of data such as, for example, memory devices and circuits, memory cards, hard disk drives (HDDs), solid-state drives (SSDs), or other data storage devices. Each data storage device 222 may include a system partition that stores data and firmware code for the data storage device 222. Each data storage device 222 may also include an operating system partition that stores data files and executables for an operating system.

Additionally or alternatively, the edge device 200 may include one or more sensors 224. Each sensor 224 may be embodied as any device or circuitry to collect data from equipment at the plant system. For example, the sensors 224 may include visual sensors 230, audio sensors 232, thermal sensors 234, leak sensors 236, and other sensors 238. Further, the edge device 200 may include one or more actuators 226. The one or more actuators 226 may be embodied as any device or circuitry to control mechanisms or systems at the plant system. The actuators 226 may include electric actuators 240, pneumatic actuators 242, hydraulic actuators 244, and other actuators 246.

Additionally or alternatively, the edge device 200 may include one or more peripheral devices 228. Such peripheral devices 228 may include any type of peripheral device commonly found in a compute device such as a display, speakers, a mouse, a keyboard, and/or other input/output devices, interface devices, and/or other peripheral devices.

As described above, the edge device 200 is illustratively in communication via the network 152, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
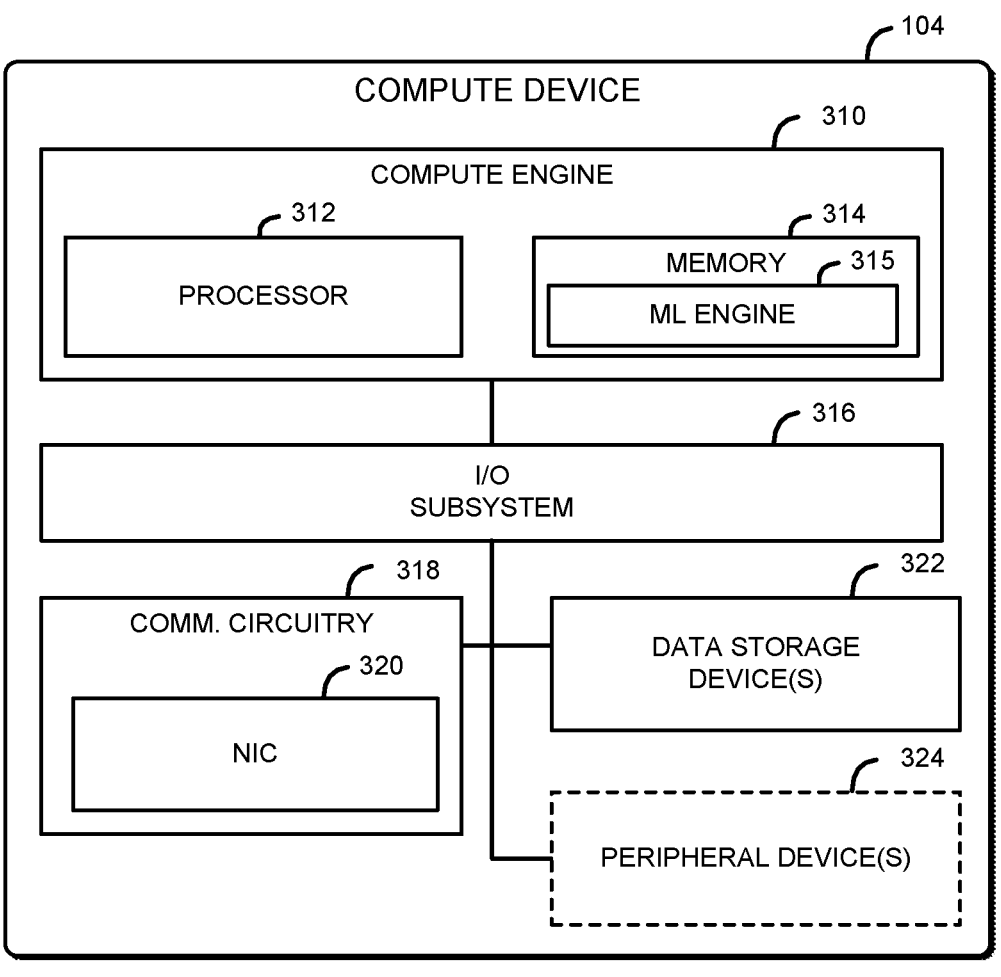
FIG. 3 is a simplified block diagram of at least one embodiment of a compute device of FIG. 1 configured to provide decentralized analytics for a group of plant sites.

Referring now to FIG. 3, components of the compute device 104 are shown. The illustrative compute device 104 includes a compute engine 310, an input/output (I/O) subsystem 316, communication circuitry 318, and one or more data storage devices 322. Of course, in other embodiments, the edge device 200 may include other or additional components, such as those commonly found in a computer (e.g., display, peripheral devices, etc.). Additionally, in some embodiments, one or more of the illustrative components may be incorporated in, or otherwise form a portion of, another component. Of course, the components depicted in FIG. 3 are merely provided as examples to illustrate the embodiments disclosed herein. In practice, the actual compute device 104 may include additional or fewer components.

The compute engine 310 may be embodied as any type of device or collection of devices capable of performing various compute functions described below. In some embodiments, the compute engine 310 may be embodied as a single device such as an integrated circuit, an embedded system, a field programmable gate array (FPGA), a system-on-a-chip (SOC), or other integrated system or device. Additionally, in some embodiments, the compute engine 310 includes or is embodied as a processor 312 and a memory 314. The processor 312 may be embodied as one or more processors, each processor being a type capable of performing the functions described herein and may be composed of similar components as the processor 212 described relative to FIG. 2.

The memory 314 may be embodied as any type of volatile (e.g., dynamic random access memory, etc.) or non-volatile memory (e.g., byte addressable memory) or data storage capable of performing the functions described herein and may be composed of similar components as the memory 214 described relative to FIG. 2. In addition, the memory 314 may include a ML engine 315. The ML engine 315 may be embodied as any device or circuitry configured to perform one or more ML techniques on data received from a fleet or plant systems or plant system equipment. ML techniques may generally include predicative analytics, online learning techniques, ensemble machine learning techniques, neural networks, traveling machine learner techniques, and so on.

The compute engine 310 is communicatively coupled with other components of the computing environment 100 via the I/O subsystem 316, which may be embodied as circuitry and/or components to facilitate input/output operations with the compute engine 310 (e.g., with the processor 312 and/or the memory 314) and other components of the compute device 104. The I/O subsystem 316 may be composed of similar components as the I/O subsystem 216 described relative to FIG. 2.

The communication circuitry 318 may be embodied as any communication circuit, device, or collection thereof, capable of enabling communications over a network between the compute device 104 and other devices, such as the compute devices 114, 128, 142. The communication circuitry 318 may be configured to use any one or more communication technology (e.g., wired or wireless communications) and associated protocols (e.g., Ethernet, Bluetooth®, Wi-Fi®, WiMAX, etc.) to effect such communication. The illustrative communication circuitry 318 includes a network interface controller (NIC) 320, which comprise similar components as the NIC 220 described relative to FIG. 2.

The one or more illustrative data storage devices 322 may be embodied as any type of devices configured for short-term or long-term storage of data such as, for example, memory devices and circuits, memory cards, hard disk drives (HDDs), solid-state drives (SSDs), or other data storage devices and may comprise similar components as the data storage devices 222 described relative to FIG. 2.

Additionally or alternatively, the compute device 104 may include one or more peripheral devices 324. Such peripheral devices 324 may include any type of peripheral device commonly found in a compute device such as a display, speakers, a mouse, a keyboard, and/or other input/output devices, interface devices, and/or other peripheral devices.

As described above, the compute device 104 is illustratively in communication via the network 152, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 5:
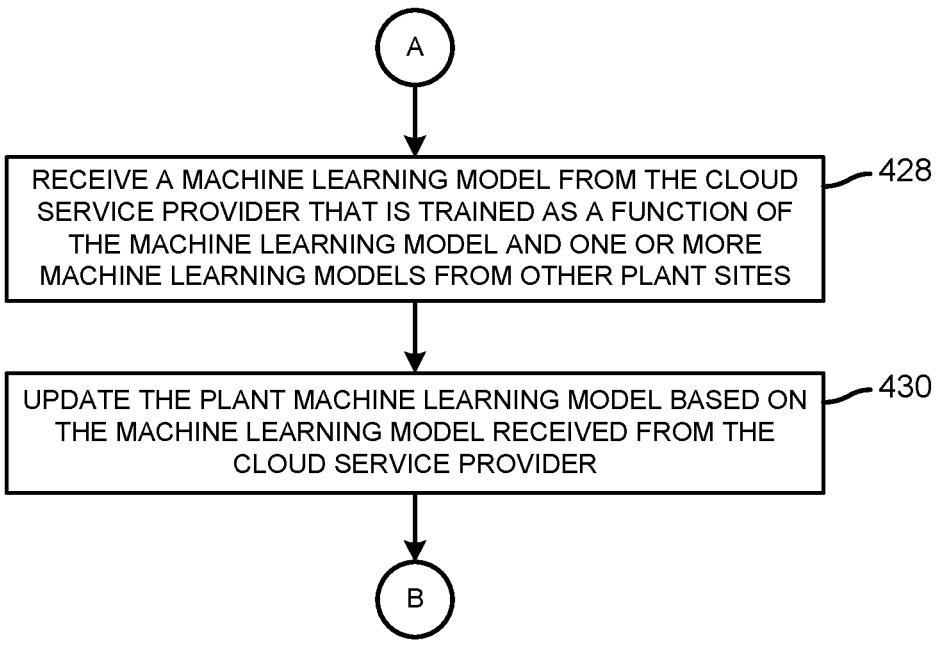

Referring now to FIGS. 4 and 5, a method 400 for providing decentralized fleet analytics is shown. More particularly, method 400 pertains to initializing a machine learning model on the local cloud service at the plant system to be transmitted to the cloud service provider 102. As shown, the method 400 begins in block 402, in which the local cloud service determines whether current streams (or batches) of data from the plant system is available. If not, then in block 404, the local cloud service retrieves one or more historical data streams available for the plant system. The historical data streams pertain to historical data that may have been obtained from the plant system at previous points in time. The local cloud service may "bootstrap" the historical data to build a plant machine learning model (at block 406). Otherwise, in block 408, if current data streams are available, the local cloud service may build a plant machine learning model from the current data streams. More particularly, local cloud service may use online machine learning techniques to export its local machine learning model to the cloud service provider 102 along with results of the current data stream and the accuracy of that data stream on the local machine learning model. The machine learning model may be written in a standard description format, such as a predictive model markup language (PMML) format and exported to the cloud service provider 102.

In block 410, the local cloud service receives streams of data from local edge devices in the plant system. In block 412, using machine learning techniques, the local cloud service analyzes the streams of data. For instance, in block 414, the local cloud service provides each received data stream as input to a machine learning function associated with the machine learning model. In block 416, the local cloud service generates one or more results from the machine learning function. In block 418, the local cloud service updates the plant machine learning model as a function of the one or more results. In block 420, the local cloud service may increment a timer used for collection of data in the stream. In block 422, the local cloud service determines whether the timer exceeds a specified threshold. If not, the method 400 returns to block 410 to continue collecting and analyzing streams of data at the plant system. However, if the timer exceeds the threshold, then in block 424, the local cloud service resets the timer. Then in block 426, the local cloud service sends the machine learning model, results associated with the machine learning model, and the accuracy associated with the data streams to the machine learning model to the cloud service provider 102.

In block 428, in return, the local cloud service may receive a machine learning model from the cloud service provider 102. The machine learning model received from the cloud service provider 102 is trained as a function of the machine learning model sent to the cloud service provider 102 as well as machine learning models received from one or more other plant systems. In block 430, the local cloud service may update the local machine learning model received from the cloud service provider 102. The method 400 may return to block 410 to continue collecting data from the plant system to further analyze those data streams using the updated machine learning model.

Referring now to FIG. 6, a method 600 for providing decentralized fleet analytics is shown. More particularly, the method 600 pertains to the cloud service provider 102 generating a machine learning model from machine learning models and insights provided by the plant systems of the fleet. As shown, the method 600 begins in block 602, in which the cloud service provider 102 determines whether historical plant data is available. The historical plant data may originate from one or more of the plant systems in the fleet. If so, then in block 604, the cloud service provider 102 trains a cloud machine learning model from the historical plant data. Doing so allows the cloud service provider 102 to "bootstrap" the historical data to initialize a machine learning model, e.g., in the event that the plant systems have not sent any current data streams to the cloud service provider 102.

In block 606, the cloud service provider 102 may receive a machine learning model, results generated from streams of data, and an accuracy of the streams of data to the machine learning model from a given plant system. In block 608, the cloud service provider 102 may train a cloud machine learning model with the received data. For instance, in block 610, the cloud service provider 102 may perform an ensemble technique on the plant machine learning model as a function of the cloud learning model, the received model, and machine learning model data (e.g., including results and insights) from other plant systems. To do so, the cloud service provider 102 may perform a variety of ensemble machine learning techniques.

For example, the cloud service provider 102 may apply a bagging ensemble technique, such as a random forest technique which combines multiple decision trees. The bagging ensemble technique involves each received machine learning model from plant systems used to vote with a given weight. For instance, if a given plant system machine learning model were a binary classifier (e.g., one that provides "yes" or "no" output), then each machine learning model may vote yes or no with the assigned given weight, and the ensemble model generated by the cloud service provider 102 may take a majority vote from the machine learning model of the plant systems and of the cloud service provider 102 (e.g., the ML model 106). The weight for a given model may be a function of an accuracy of the model on the data stream, the size of the data stream, and an expected quality of the data stream. If the given machine learning model of the plant system were a regressor, then the ensemble model generated by the cloud service provider 102 may take a weighted average of the regression outputs from the machine learning model of the plant system and of the cloud service provider 102. Note that the machine learning model received from the plant systems may all be different types of machine learning models. For example, a machine learning model from a given plant system may be a decision tree, a machine learning model from another given plant system may be a neural network, a machine learning model from yet another given plant system may be a Support Vector Machine, and so on.

As another example, the cloud service provider 102 may perform a stacking ensemble technique. Using such a technique, the ensemble machine learning model may be generated by training the ML model 106 with data on the cloud service provider 102 with the predications of the received machine learning models from the plant systems on the data on the cloud as additional input for the ML model 106.

As yet another example, the cloud service provider 102 may perform a Traveling Machine Learner (TML) technique. Generally, TML leverages two characteristics. One characteristic is that machine learning models may be incrementally trained and updated on microbatches of data. A second characteristic is that machine learning models can be exported from plant systems. A TML model may originate in the cloud service provider 102 and train incrementally from any data in the cloud service provider 102. Then the TML model may travel (e.g., via a model export command) to a first plant system and train from the data at that plant system. The first plant system may update its machine learning model to the TML model. The resulting TML model then "travels" to a second plant system (e.g., by transmitting the TML model to the cloud service provider 102, which in turn transmits the TML model to the second plant system). The second plant system may update its machine learning model to the TML model and carry on the process to other successive plant systems in a similar manner in a round robin fashion. If the plant systems are connected to one another, then the TML model may travel between plants (e.g., and skip transmitting intermediate TML models to the cloud service provider 102 entirely). However, in such a case, the TML model might not benefit from data provided by the cloud service provider 102.

In block 612, the cloud service provider 102 may incrementally update the cloud machine learning model by the plant machine learning model as well as plant machine learning models of other plant systems. In block 614, the cloud service provider 102 may send the trained cloud machine learning model to plant system. Doing so allows the plant system to update its machine learning model with the transmitted cloud machine learning model.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A computer-implemented method for analyzing data in one of a plurality of plant sites, each of the plurality of plant sites including a computing device configured to communicate with one or more edge devices of the plant site, the method comprising:

building, by the computing device associated with the one of the plurality of plant sites, a first machine learning model of one or more first streams of data received from the one or more edge devices associated with the one of the plurality of plant sites;

providing, by the computing device, each of the one or more first streams of data as input to a machine learning function associated with the first machine learning model;

generating, by the computing device, one or more results from the machine learning function associated with the first machine learning model;

sending, by the computing device, the first machine learning model and the one or more results from the machine learning function associated with the first machine learning model to the cloud service separate from the computing device associated with one of the plurality of plant sites;

receiving, by the computing device, a second machine learning model from the cloud service, the second machine learning model being trained by the cloud service as a function of (i) the first machine learning model, (ii) the one or more results from the machine learning function associated with the first machine learning model, (iii) one or more machine learning models built by others of the plurality of plant sites, and (iv) results generated by providing one or more streams of data as input to one or more machine learning functions associated with the one or more machine learning models built by the others of the plurality of plant sites, wherein the second machine learning model is trained without sending the one or more first streams of data from the computing device to the cloud service, and wherein the second machine learning model is transmitted in turn by the cloud service to each of the others of the plurality of plant sites to be trained in turn by streams of data at each of the others of the plurality of plant sites;

updating, by the computing device, the first machine learning model based on the second machine learning model; and further updating, by the computing device, the first machine learning model based on the one or more first streams of data associated with the one of the plurality of plant sites after updating the first machine learning model based on the second machine learning model.

2. The method of claim 1, wherein building the first machine learning model comprises:

updating, by the computing device, the first machine learning model based on the one or more results.

3. The method of claim 1, further comprising determining, by the computing device, whether one or more historical data streams are available for the one of the plurality of plant sites, wherein building the first machine learning model is further based on the historical data streams.

4. The method of claim 1, further comprising receiving, by the computing device, one or more streams of data from each of the one or more edge devices in the one of the plurality of plant sites.

5. The method of claim 1, wherein receiving the second machine learning model from the cloud service comprises receiving the second machine learning model that is trained using an ensemble technique on the machine learning model as a function of the machine learning model and the one or more machine learning models of the others of the plurality of plant sites.

6. The method of claim 1, wherein receiving the second machine learning model from the cloud service comprises receiving the second machine learning model that is trained incrementally by each of the others of the plurality of plant sites.

7. A non-transitory computer-readable storage medium comprising a plurality of instructions, which, when executed on a processor, causes a computing device at one of a plurality of plant sites each including a computing device configured to communicate with one or more edge devices of the plant site to:

build a first machine learning model of one or more first streams of data received from the one or more edge devices associated with the one of the plurality of plant sites;

provide each of the one or more first streams of data as input to a machine learning function associated with the first machine learning model;

generate one or more results from the machine learning function;

send the first machine learning model and the one or more results from the machine learning function associated with the first machine learning model to the cloud service separate from the computing device associated with the one of the plurality of plant sites;

receive a second machine learning model from the cloud service, the second machine learning model being trained by the cloud service as a function of (i) the first machine learning model, (ii) the one or more results from the machine learning function associated with the first machine learning model, (iii) one or more machine learning models built by others of the plurality of plant sites, and (iv) results generated by providing one or more streams of data as input to one or more machine learning functions associated with the one or more machine learning models built by the others of the plurality of plant sites, wherein the second machine learning model is trained without sending the one or more first streams of data from the computing device to the cloud service, and wherein the second machine learning model is transmitted in turn by the cloud service to each of the others of the plurality of plant sites to be trained in turn by streams of data at each of the others of the plurality of plant sites;

update the first machine learning model based on the second machine learning model; and further update the first machine learning model based on the one or more first streams of data associated with the one of the plurality of plant sites after updating the first machine learning model based on the second machine learning model.

8. The non-transitory computer-readable storage medium of claim 7, wherein to build the first machine learning model comprises to:

update the first machine learning model based on the one or more results.

9. The non-transitory computer-readable storage medium of claim 7, wherein the plurality of instructions further causes the computing device to determine whether one or more historical data streams are available for the one of the plurality of plant sites, wherein building the first machine learning model is further based on the historical data streams.

10. The non-transitory computer-readable storage medium of claim 7, wherein the plurality of instructions further causes the computing device to receive one or more streams of data from each of a plurality of the one or more edge devices in the one of the plurality of plant sites.

11. The non-transitory computer-readable storage medium of claim 7, wherein to receive the second machine learning model from the cloud service comprises to receive the second machine learning model that is trained using an ensemble technique on the machine learning model as a function of the machine learning model and the one or more machine learning models of the others of the plurality of plant sites.

12. The non-transitory computer-readable storage medium of claim 7, wherein to receive the second machine learning model from the cloud service comprises to receive the second machine learning model that is trained incrementally by each of the others of the plurality of plant sites.

13. A computing device of one of a plurality of plant sites, each of the plurality of plant sites including a respective computing device configured to communicate with one or more edge devices of the plant site, the computing device comprising:

a processor; and a memory storing a plurality of instructions, which, when executed on the processor, causes the computing device to:

build a first machine learning model of one or more first streams of data received from the one or more edge devices associated with the one of the plurality of plant sites;

provide each of the one or more first streams of data as input to a machine learning function associated with the first machine learning model;

generate one or more results from the machine learning function;

send the first machine learning model and the one or more results from the machine learning function associated with the first machine learning model to the cloud service separate from the computing device associated with the one of the plurality of plant sites;

receive a second machine learning model from the cloud service, the second machine learning model being trained by the cloud service as a function of (i) the first machine learning model, (ii) the one or more results from the machine learning function associated with the first machine learning model, (iii) one or more machine learning models built by others of the plurality of plant sites, and (iv) results generated by providing one or more streams of data as input to one or more machine learning functions associated with the one or more machine learning models built by the others of the plurality of plant sites, wherein the second machine learning model is trained without sending the one or more first streams of data from the computing device to the cloud service, and wherein the second machine learning model is transmitted in turn by the cloud service to each of the others of the plurality of plant sites to be trained in turn by streams of data at each of the others of the plurality of plant sites;

update the first machine learning model based on the second machine learning model; and further update the first machine learning model based on the one or more first streams of data associated with the one of the plurality of plant sites after updating the first machine learning model based on the second machine learning model.

14. The computing device of claim 13, wherein to build the first machine learning model comprises to:

update the first machine learning model based on the one or more results.

15. The computing device of claim 13, wherein the plurality of instructions further causes the computing device to determine whether one or more historical data streams are available for the one of the plurality of plant sites, wherein building the first machine learning model is further based on the historical data streams.

16. The computing device of claim 13, wherein the plurality of instructions further causes the computing device to receive one or more streams of data from each of the one or more edge devices in the one of the plurality of plant sites.

17. The computing device of claim 13, wherein to receive the second machine learning model from the cloud service comprises to receive the second machine learning model that is trained using an ensemble technique on the machine learning model as a function of the machine learning model and the one or more machine learning models of the others of the plurality of plant sites.

18. The computer-implemented method of claim 1, wherein the second machine learning model is trained by the cloud service further based on historical plant data received by the cloud service prior to receiving the first machine learning model.

* * * * *